United States Patent
Chen (10) Patent No.: US 10,268,069 B2
(45) Date of Patent: Apr. 23, 2019

(54) TRANSPARENT LIQUID CRYSTAL DISPLAY

(71) Applicant: Shenzhen China Star Optoelectronics Technology Co., Ltd., Shenzhen (CN)

(72) Inventor: Lixuan Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 198 days.

(21) Appl. No.: 15/119,727

(22) PCT Filed: Jul. 15, 2016

(86) PCT No.: PCT/CN2016/090107
§ 371 (c)(1),
(2) Date: Aug. 18, 2016

(87) PCT Pub. No.: WO2017/215066
PCT Pub. Date: Dec. 21, 2017

(65) Prior Publication Data
US 2018/0180937 A1    Jun. 28, 2018

(30) Foreign Application Priority Data
Jun. 14, 2016 (CN) .......................... 2016 1 0417005

(51) Int. Cl.
*G02F 1/1335* (2006.01)
*G02F 1/1333* (2006.01)

(52) U.S. Cl.
CPC .. *G02F 1/133528* (2013.01); *G02F 1/133377* (2013.01); *G02F 1/133502* (2013.01);
(Continued)

(58) Field of Classification Search
CPC ......... G02F 1/133528; G02F 1/133377; G02F 1/133502; G02F 2203/01;
(Continued)

(56) References Cited

U.S. PATENT DOCUMENTS

| | | | | |
|---|---|---|---|---|
| 5,867,236 A * | 2/1999 | Babuka | ................. | G02F 1/1339 349/73 |
| 6,014,188 A * | 1/2000 | Yamada | .............. | G02F 1/13334 345/37 |
| 6,078,379 A * | 6/2000 | Nagae | ................... | G02F 1/1339 349/153 |
| 2008/0094565 A1* | 4/2008 | Jeong | ................. | G02F 1/13336 349/190 |

(Continued)

FOREIGN PATENT DOCUMENTS

CN    202472183 U    10/2012
CN    105242342 A    1/2016

*Primary Examiner* — Shan Liu
(74) *Attorney, Agent, or Firm* — Leong C. Lei (57) ABSTRACT

The invention provides a transparent LCD. By providing stop walls (4) in LC layer (2) to divide the LC layer (2) into the first areas (21) disposed correspondingly to the active areas (11) and the second areas (22) disposed correspondingly to the non-active areas (12), and providing LC only in the first areas (21) but not in the second areas (22), and by dividing the metal grid polarizers into polarizing areas corresponding to active areas (11) and non-polarizing areas corresponding to non-active areas (12), the polarization effect only occurs on the active areas (11) instead of the non-active areas (12), the invention reduces the number of TFTs, improves the transmittance ratio of the transparent LCD and simplifies the control system for transparent LCD.

12 Claims, 6 Drawing Sheets

(52) U.S. Cl.
CPC ............ *G02F 2001/133538* (2013.01); *G02F 2001/133548* (2013.01); *G02F 2203/01* (2013.01)

(58) Field of Classification Search
CPC ....... G02F 2001/133548; G02F 1/0311; G02F 1/116; G02F 1/1335; G02F 1/133536; G02F 1/13362; G02F 1/133533; G02F 2001/133531; G02F 2001/133521; G02F 2001/13356; G02F 2001/133538; G02F 2001/133541; G02F 2001/133543; G02F 2001/133545; G02F 2001/13355; G02F 2001/133562; G02F 2001/133567; B29D 11/00644; B32B 17/10458; B32B 2307/42; H01L 51/5293; H01R 12/7005; H04B 10/532; G01J 5/0825; G02B 5/3033; G02B 6/0056; G02B 6/02109; G03F 9/7065; G03F 2013/16; G01R 33/3678; C09K 19/0208
USPC .................................................... 349/96–103
See application file for complete search history.

(56) References Cited

U.S. PATENT DOCUMENTS

| | | | |
|---|---|---|---|
| 2009/0115956 A1* | 5/2009 | Lee ........................ | G02F 1/1339 349/161 |
| 2009/0273744 A1* | 11/2009 | Wang .................... | G02B 5/3058 349/96 |
| 2014/0063421 A1* | 3/2014 | You ........................ | G02F 1/1335 349/106 |
| 2014/0111746 A1* | 4/2014 | Kim .................... | G02F 1/133377 349/106 |
| 2014/0152943 A1* | 6/2014 | Dorjgotov .............. | H05B 33/22 349/96 |
| 2014/0292839 A1* | 10/2014 | Huang ............... | G02F 1/133533 345/694 |
| 2014/0307430 A1* | 10/2014 | Lo ........................... | G09F 13/00 362/231 |
| 2016/0161798 A1* | 6/2016 | Lee ................... | G02F 1/133528 349/65 |
| 2017/0131593 A1* | 5/2017 | Tang ................. | G02F 1/133528 |
| 2017/0146808 A1* | 5/2017 | Tatzel ............. | B29D 11/00644 |

* cited by examiner

TRANSPARENT LIQUID CRYSTAL DISPLAY

BACKGROUND OF THE INVENTION

1. Field of the Invention

The present invention relates to the field of display, and in particular to a transparent liquid crystal display.

2. The Related Arts

As the technology rapidly progresses and various new technologies emerge, the transparent display technology is gaining much attention due to the characteristics and unique application of the transparent display panel.

The transparent display panel refers to a display which is transparent so that the viewer can both see the images displayed by the display and the actual background behind the display. The transparent display has many applications, such as, window display for building or vehicles. Other than those large-area applications, the transparent display is also applicable to handheld devices, such as, viewing a map while also viewing the view behind the display.

The majority of current display market is estimated to be replaced by the transparent displays, for example, in building, advertisements, and public information applications. The transparent displays are categorized as head-up display (HUD), transparent liquid crystal display (LCD) and the transparent organic electroluminescent display. In these transparent displays, the HUD is implemented with image projection, while transparent LCD and the transparent organic electroluminescent display meet the true definition of transparent displays.

In known technology, the transparent LCD often comprises an active area (comprising red, green and blue sub-pixels) and a transparent area (comprising no red, green and blue sub-pixels and being transmittable to external light); wherein the active area provides the images for the viewer while the transparency state of the transparent area allows the viewer to see the view behind through the display. Generally, the active area and the transparent area of the transparent LCD are controlled by independent thin film transistors (TFT). When the transparent area is controlled by separate TFT, at least four sets of TFTs controlling signal outputs for the entire pixel respectively control the red sub-pixel, green sub-pixel, blue sub-pixel, and transparent area. When the transparent area is designed to be located next to the red, green and blue sub-pixels, there are as many as six sets of TFTs controlling signal outputs to respectively control the red, green and blue sub-pixels, as well as the transparent areas next to the red, green and blue sub-pixels. The increase in the number of TFTs in the LCD will lead to the reduction in aperture ratio. Also, more TFTs imply more signal outputs, which leads to a complex control system for transparent LCD.

SUMMARY OF THE INVENTION

The object of the present invention is to provide a transparent LCD, able to improve the transmittance of the transparent LCD, reduce the number of TFTs and simplify the control system for transparent LCD.

To achieve the above object, the present invention provides a transparent LCD, which comprises: a first substrate, a second substrate disposed corresponding and opposite to the first substrate, and a liquid crystal (LC) layer sandwiched between the first substrate and the second substrate; the transparent LCD comprising a plurality of active areas and a plurality of non-active areas arranged alternately, the non-active areas being transparent areas; the LC layer comprising: a plurality of first areas disposed correspondingly to the plurality of active areas, and a plurality of second areas disposed correspondingly to the plurality of non-active areas, stop walls disposed between the first areas and the second areas, and the LC molecules of the LC layer being located in the first areas.

In a preferred embodiment, the present invention further comprises a first polarizer disposed at a side of the first substrate facing away from the LC layer, and a second polarizer disposed at a side of the second substrate facing away from LC layer; both the first polarizer and the second polarizer being metal grid polarizers, the first polarizer comprising a plurality of first polarizing areas disposed correspondingly to the plurality of active areas, and a plurality of first non-polarizing areas disposed correspondingly to the plurality of non-active areas; the second polarizer comprising a plurality of second polarizing areas disposed correspondingly to the plurality of active areas, and a plurality of second non-polarizing areas disposed correspondingly to the plurality of non-active areas; the first polarizer and the second polarizer disposing metal grid only in the first polarizing areas and the second polarizing areas, the polarization axis of the first polarizing areas and the polarization axis of the second polarizing areas being mutually perpendicular.

In a preferred embodiment, the first polarizer or the second polarizer is also disposed with an anti-reflection structure.

The active areas have the same size as the non-active areas, the first polarizer or the second polarizer is slidable along the direction the active areas and the non-active areas are arranged; by the sliding of the first polarizer or the second polarizer, the first polarizing areas or the second polarizing areas move from corresponding to active areas to corresponding to non-active areas to shield the non-active areas.

In a preferred embodiment, the stop walls are made of Polyimide (PI), photo-resist material or metal.

In a preferred embodiment, the active area comprises one or more display pixels, with ach display pixel comprising a red sub-pixel, a green sub-pixel and a blue sub-pixel arranged in the above order.

The plurality of active areas and the plurality of non-active areas are arranged in alternate stripes.

The plurality of active areas and the plurality of non-active areas are arranged in an alternate array.

The present invention also provides a transparent LCD, which comprises: a first substrate, a second substrate disposed corresponding and opposite to the first substrate, and a liquid crystal (LC) layer sandwiched between the first substrate and the second substrate; the transparent LCD comprising a plurality of active areas and a plurality of non-active areas arranged alternately, the non-active areas being transparent areas; the LC layer comprising: a plurality of first areas disposed correspondingly to the plurality of active areas, and a plurality of second areas disposed correspondingly to the plurality of non-active areas, stop walls disposed between the first areas and the second areas, and the LC molecules of the LC layer being located in the first areas; further comprising a first polarizer disposed at a side of the first substrate facing away from the LC layer, and a second polarizer disposed at a side of the second substrate facing away from LC layer; both the first polarizer and the second polarizer being metal grid polarizers, the first polarizer comprising a plurality of first polarizing areas disposed correspondingly to the plurality of active areas, and a plurality of first non-polarizing areas disposed correspondingly to the plurality of non-active areas; the second polarizer comprising a plurality of second polarizing areas disposed correspondingly to the plurality of active areas, and a plurality of second non-polarizing areas disposed correspondingly to the plurality of non-active areas; the first polarizer and the second polarizer disposing metal grid only in the first polarizing areas and the second polarizing areas, the polarization axis of the first polarizing areas and the polarization axis of the second polarizing areas being mutually perpendicular; wherein the stop walls being made of Polyimide (PI), photo-resist material or metal.

Compared to the known techniques, the present invention provides the following advantages: the present invention provides a transparent LCD. By providing stop walls in LC layer to divide the LC layer into the first areas disposed correspondingly to the active areas and the second areas disposed correspondingly to the non-active areas, and providing LC only in the first areas but not in the second areas, the present no longer needs to provide TFT to control the second areas because there is no LC present. As such, the present invention reduces the number of TFTs, improves the transmittance ratio of the transparent LCD and simplifies the control system for transparent LCD. Moreover, by dividing the metal grid polarizers into polarizing areas corresponding to active areas and non-polarizing areas corresponding to non-active areas, the polarization effect only occurs on the active areas instead of the non-active areas, which further improves the transmittance ratio at non-active areas.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
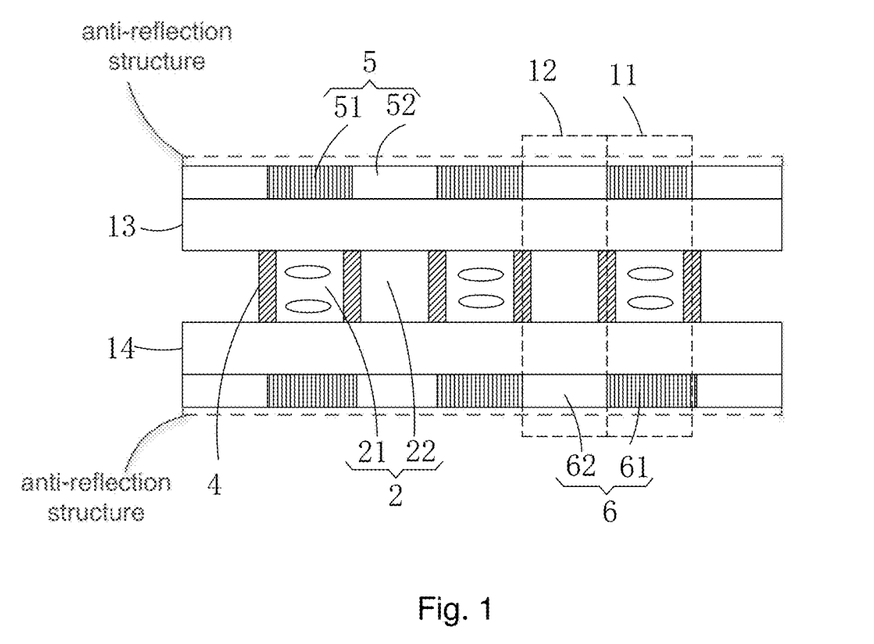
FIG. 1 is a schematic view showing the structure of a transparent LCD provided by an embodiment of the present invention.

Refer to FIG. 1. The present invention provides a transparent LCD, which comprises: a first substrate 13, a second substrate 14 disposed corresponding and opposite to the first substrate 13, and a liquid crystal (LC) layer 2 sandwiched between the first substrate 13 and the second substrate 14.

Specifically, the first substrate 13 is one of the color filter (CF) substrate or the array substrate; and the second substrate 14 is the other one of the CF substrate or the array substrate, and is different from the first substrate 13.

The transparent LCD comprises a plurality of active areas 11 and a plurality of non-active areas 12 arranged alternately, and the non-active areas are transparent areas.

Optionally, the active area 11 comprises one or more display pixels, with ach display pixel comprising a red sub-pixel, a green sub-pixel and a blue sub-pixel arranged in the above order for image displaying. The non-active areas are transparent areas for the light to pass through. The viewer can see through the transparent areas to view the scene behind the display. It should be noted that the display pixel in the active area 11 may also comprise sub-pixels of other colors, and the red, green and blue sub-pixels may also be arranged in other order.

Correspondingly, the LC layer comprises: a plurality of first areas 21 disposed correspondingly to the plurality of active areas 11, and a plurality of second areas 22 disposed correspondingly to the plurality of non-active areas 12, stop walls 4 disposed between the first areas 21 and the second areas 22, and the LC molecules of the LC layer 2 being located in the first areas 21.

It should be noted that the LC molecules of the LC layer 2 are only disposed in the first areas 21 but not in the second areas 22, the present no longer needs to provide TFT to control the second areas 22 because there are no LC molecules present. As such, the present invention reduces the number of TFTs, reduces the number of signal outputs and simplifies the control system.

Figure 4:
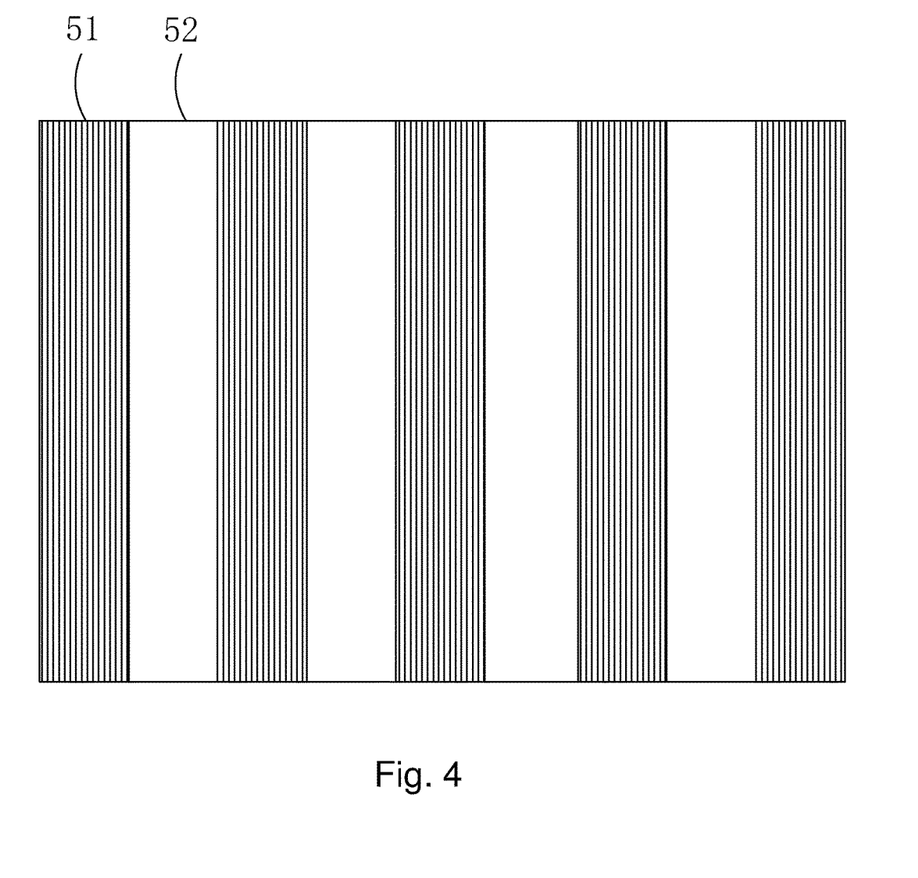
FIG. 4 is a top view showing the of the structure of the first polarizer of the transparent LCD provided by the first embodiment of the present invention.

Moreover, refer to FIG. 1 and FIG. 4. The transparent LCD further comprises a first polarizer 5 disposed at a side of the first substrate 13 facing away from the LC layer 2, and a second polarizer 6 disposed at a side of the second substrate 14 facing away from LC layer 2.

Both the first polarizer 5 and the second polarizer 6 are metal grid polarizers; the first polarizer 5 comprises a plurality of first polarizing areas 51 disposed correspondingly to the plurality of active areas 11, and a plurality of first non-polarizing areas 52 disposed correspondingly to the plurality of non-active areas 12; the second polarizer 6 comprises a plurality of second polarizing 61 areas disposed correspondingly to the plurality of active areas 11, and a plurality of second non-polarizing areas 62 disposed correspondingly to the plurality of non-active areas 12.

The first polarizer 5 and the second polarizer 6 dispose the metal grid only in the first polarizing areas 51 and the second polarizing areas 61; and the polarization axis of the first polarizing areas 51 and the polarization axis of the second polarizing areas 61 are mutually perpendicular.

It should be noted that because the first polarizer 5 and the second polarizer 6 dispose the metal grid only in the first polarizing areas 51 and the second polarizing areas 61, not in the first non-polarizing areas 52 and the second non-polarizing areas 62, the polarization effect only occurs in the first polarizing areas 51 and the second polarizing areas 61, not in the first non-polarizing areas 52 and the second non-polarizing areas 62. As a result, the polarized light is only generated in the active areas 11, and the light in the non-active areas 12 can pass without generating polarized light, resulting in a high transmittance in non-active areas 12.

Moreover, the display side of the LCD is also disposed with an anti-reflection structure. When the display side of the LCD is located at the side of the first polarizer 5 facing away from the LC layer 2, the anti-reflection structure is provided on the side of the first polarizer 5 facing away from the LC layer 2; when the display side of the LCD is located at the side of the second polarizer 6 facing away from the LC layer 2, the anti-reflection structure is provided on the side of the second polarizer 6 facing away from the LC layer 2.

Figure 2:
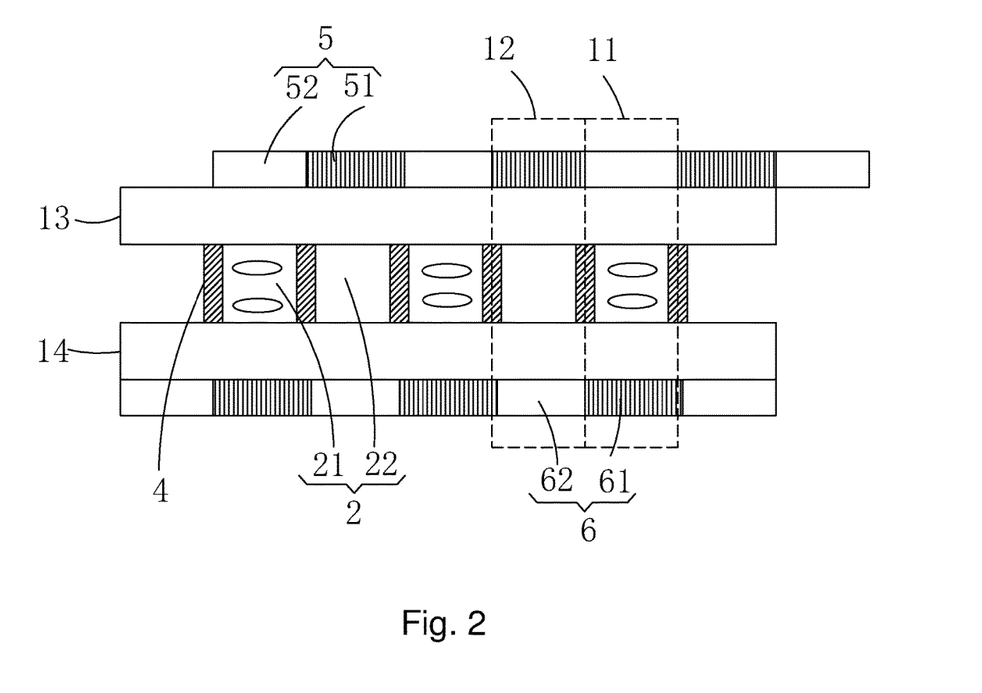
FIG. 2 is a schematic view showing the post-sliding first polarizer of a transparent LCD provided by an embodiment of the present invention.

Furthermore, the size of the active area 11 and the size of non-active area 12 can vary depending on the application, and can be equal or different. Refer to FIG. 2, to mask the light from the non-active areas 12 when displaying a dark screen, the size of the active area 11 and the size of the non-active area 12 can be the same. Also, the first polarizer 5 or the second polarizer 6 is slidable along the direction the active areas 11 and the non-active areas 12 are arranged. By the sliding of the first polarizer 5 or the second polarizer 6, the first polarizing areas 51 or the second polarizing areas 52 move from corresponding to active areas 11 to corresponding to non-active areas 12 to shield the non-active areas 12. By using the polarization effect of the first polarizing areas 51 or the second polarizing areas 52 to shield the light from the non-active areas 12, the transmittance can be controlled to be on or off.

Optionally, the stop walls 4 are made of Polyimide (PI), photo-resist material or metal.

Figure 3:
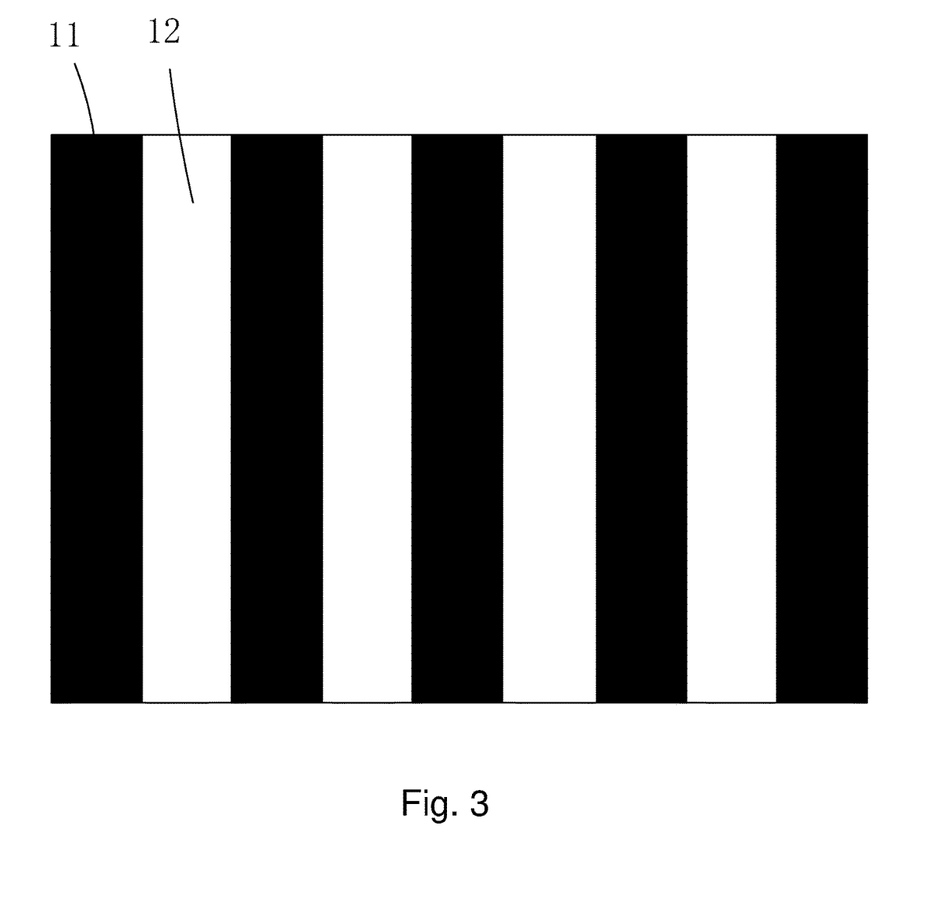
FIG. 3 is a schematic view showing the distribution of the active and non-active areas of the transparent LCD provided by the first embodiment of the present invention.
Figure 5:
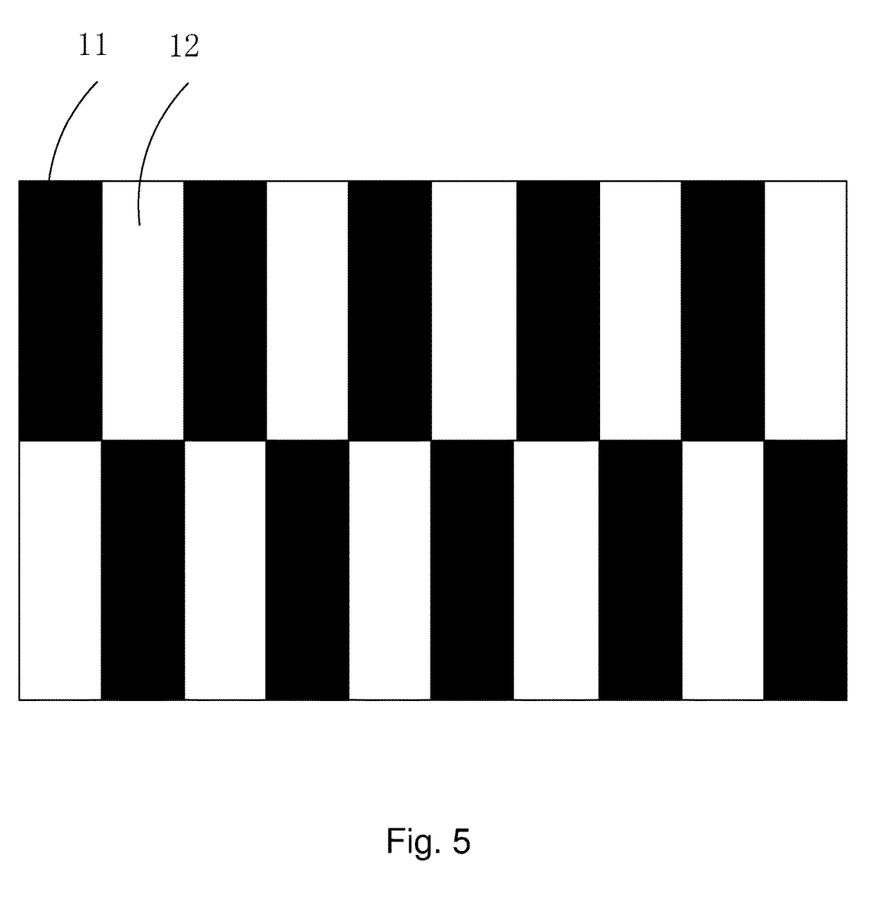
FIG. 5 is a schematic view showing the distribution of the active and non-active areas of the transparent LCD provided by the second embodiment of the present invention.
Figure 6:
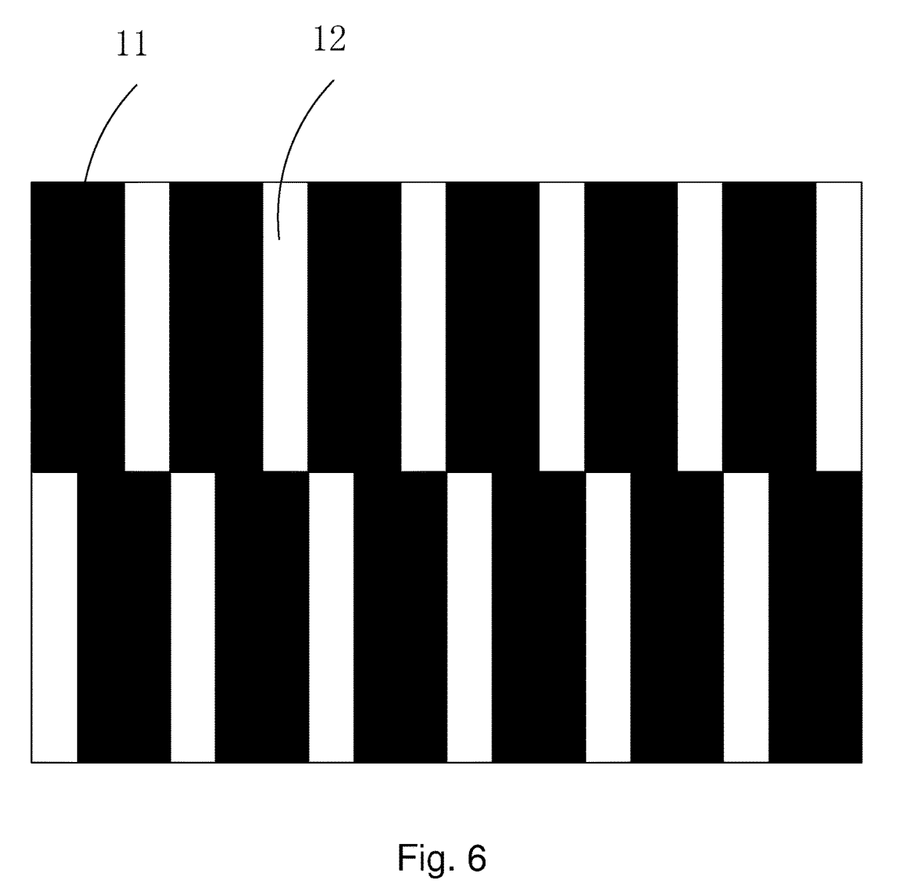
FIG. 6 is a schematic view showing the distribution of the active and non-active areas of the transparent LCD provided by the third embodiment of the present invention.

It should be noted that there are various options for the alternate arrangements for the plurality of active areas 11 and the plurality of non-active areas 12. For example, in the first embodiment, as shown in FIG. 3, the plurality of active areas 11 and the plurality of non-active areas 12 are arranged in stripes alternately. In other words, the plurality of active areas 11 and the plurality of non-active areas 12 divide the display side of the transparent LCD into a plurality of vertical stripes, with the stripes of active areas 11 and non-active areas 12 arranged alternately. The width of the active area 11 stripe and the width of the non-active area 12 stripe can be the equal or different. To avoid showing stripe appearance when displaying, in the second embodiment, as shown in FIG. 5, the plurality of active areas 11 and the plurality of non-active areas 12 are arranged in arrays alternately. In other words, the plurality of active areas 11 and the plurality of non-active areas 12 divide the display side of the transparent LCD into a plurality of rectangles, and the rectangles are arranged alternately in an array. In both the column direction and row direction, the plurality of active areas 11 and the plurality of non-active areas 12 are all arranged alternately, and the rectangles of the plurality of active areas 11 and the plurality of non-active areas 12 have the same length in column direction. Moreover, refer to FIG. 6 for the third embodiment, wherein the rectangles of the plurality of active areas 11 and the plurality of non-active areas 12 have different lengths in column direction, but also able to realize an array arrangement of the plurality of active areas 11 and the plurality of non-active areas 12. In the second and third embodiments of the present invention, the array arrangement of the plurality of active areas 11 and the plurality of non-active areas 12 can avoid the displayed image to appear as stripes so as to improve the display quality.

In summary, the present invention provides a transparent LCD. By providing stop walls in LC layer to divide the LC layer into the first areas disposed correspondingly to the active areas and the second areas disposed correspondingly to the non-active areas, and providing LC only in the first areas but not in the second areas, the present no longer needs to provide TFT to control the second areas because there is no LC present. As such, the present invention reduces the number of TFTs, improves the transmittance ratio of the transparent LCD and simplifies the control system for transparent LCD. Moreover, by dividing the metal grid polarizers into polarizing areas corresponding to active areas and non-polarizing areas corresponding to non-active areas, the polarization effect only occurs on the active areas instead of the non-active areas, which further improves the transmittance ratio at non-active areas.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A transparent liquid crystal display (LCD), which comprises: a first substrate, a second substrate disposed corresponding and opposite to the first substrate, and a liquid crystal (LC) layer sandwiched between the first substrate and the second substrate;

the transparent LCD comprising a plurality of active areas and a plurality of non-active areas arranged alternately, the non-active areas being transparent areas;

the LC layer comprising: a plurality of first areas disposed correspondingly to the plurality of active areas, and a plurality of second areas disposed correspondingly to the plurality of non-active areas, stop walls disposed between the first areas and the second areas, and the LC molecules of the LC layer being located in the first areas;

wherein the second areas of the LC layer comprise a void space free of LC molecules and the LC molecules are confined in the first areas by the stop walls;

further comprising a first polarizer disposed at a side of the first substrate facing away from the LC layer, and a second polarizer disposed at a side of the second substrate facing away from LC layer;

both the first polarizer and the second polarizer being metal grid polarizers, the first polarizer comprising a plurality of first polarizing areas disposed correspondingly to the plurality of active areas, and a plurality of first non-polarizing areas disposed correspondingly to the plurality of non-active areas; the second polarizer comprising a plurality of second polarizing areas disposed correspondingly to the plurality of active areas, and a plurality of second non-polarizing areas disposed correspondingly to the plurality of non-active areas;

the first polarizer and the second polarizer disposing metal grid only in the first polarizing areas and the second polarizing areas, the polarization axis of the first polarizing areas and the polarization axis of the second polarizing areas being mutually perpendicular.

2. The transparent LCD as claimed in claim 1, wherein an anti-reflection structure is disposed on a side of the first polarizer or the second polarizer facing away from the LC layer.

3. The transparent LCD as claimed in claim 1, wherein the active areas have the same size as the non-active areas, the first polarizer or the second polarizer is slidable along a direction in which the active areas and the non-active areas are arranged; by the sliding of the first polarizer or the second polarizer, the first polarizing areas or the second polarizing areas move from corresponding to the active areas to corresponding to the non-active areas to shield the non-active areas.

4. The transparent LCD as claimed in claim 1, wherein the active area comprises one or more display pixels, each display pixel comprising a red sub-pixel, a green sub-pixel and a blue sub-pixel arranged in the above order.

5. The transparent LCD as claimed in claim 1, wherein the plurality of active areas and the plurality of non-active areas are arranged in alternate stripes.

6. The transparent LCD as claimed in claim 1, wherein the plurality of active areas and the plurality of non-active areas are arranged in an alternate array.

7. A transparent liquid crystal display (LCD), which comprises: a first substrate, a second substrate disposed corresponding and opposite to the first substrate, and a liquid crystal (LC) layer sandwiched between the first substrate and the second substrate;

the transparent LCD comprising a plurality of active areas and a plurality of non-active areas arranged alternately, the non-active areas being transparent areas;

the LC layer comprising: a plurality of first areas disposed correspondingly to the plurality of active areas, and a plurality of second areas disposed correspondingly to the plurality of non-active areas, stop walls disposed between the first areas and the second areas, and the LC molecules of the LC layer being located in the first areas;

wherein the second areas of the LC layer comprise a void space free of LC molecules and the LC molecules are confined in the first areas by the stop walls;

further comprising a first polarizer disposed at a side of the first substrate facing away from the LC layer, and a second polarizer disposed at a side of the second substrate facing away from LC layer;

both the first polarizer and the second polarizer being metal grid polarizers, the first polarizer comprising a plurality of first polarizing areas disposed correspondingly to the plurality of active areas, and a plurality of first non-polarizing areas disposed correspondingly to the plurality of non-active areas; the second polarizer comprising a plurality of second polarizing areas disposed correspondingly to the plurality of active areas, and a plurality of second non-polarizing areas disposed correspondingly to the plurality of non-active areas;

the first polarizer and the second polarizer disposing metal grid only in the first polarizing areas and the second polarizing areas, the polarization axis of the first polarizing areas and the polarization axis of the second polarizing areas being mutually perpendicular;

wherein the stop walls being made of Polyimide (PI), photo-resist material or metal.

8. The transparent LCD as claimed in claim 7, wherein an anti-reflection structure is disposed on a side of the first polarizer or the second polarizer facing away from the LC layer.

9. The transparent LCD as claimed in claim 7, wherein the active areas have the same size as the non-active areas, the first polarizer or the second polarizer is slidable along a direction in which the active areas and the non-active areas are arranged; by the sliding of the first polarizer or the second polarizer, the first polarizing areas or the second polarizing areas move from corresponding to the active areas to corresponding to the non-active areas to shield the non-active areas.

10. The transparent LCD as claimed in claim 7, wherein the active area comprises one or more display pixels, each display pixel comprising a red sub-pixel, a green sub-pixel and a blue sub-pixel arranged in the above order.

11. The transparent LCD as claimed in claim 7, wherein the plurality of active areas and the plurality of non-active areas are arranged in alternate stripes.

12. The transparent LCD as claimed in claim 7, wherein the plurality of active areas and the plurality of non-active areas are arranged in an alternate array.

* * * * *